United States Patent [19]

Purcell et al.

[11] Patent Number: 5,167,307
[45] Date of Patent: Dec. 1, 1992

[54] FLOATING CABLE LOOP CONTROL ASSEMBLY

[75] Inventors: Larry E. Purcell; James J. Krannitz, both of Lancaster, Ohio

[73] Assignee: The Babcock & Wilcox Company, New Orleans, La.

[21] Appl. No.: 737,459

[22] Filed: Jul. 29, 1991

[51] Int. Cl.⁵ ............................................ H02G 11/00
[52] U.S. Cl. .................... 191/12 R; 15/317; 137/355.16
[58] Field of Search .......... 191/12 R, 12.2 R; 15/316.1, 317, 318; 137/355.16, 355.2

[56] References Cited

U.S. PATENT DOCUMENTS

| | | | |
|---|---|---|---|
| 3,373,954 | 3/1968 | Hilsinger, Jr. | 191/12 R X |
| 3,439,376 | 4/1969 | Nelson et al. | 15/317 |
| 3,608,125 | 4/1971 | Nelson | 191/12 R X |
| 3,819,880 | 6/1974 | Johnston | 191/12 R |
| 3,823,279 | 7/1974 | Rausch et al. | 191/12 R |
| 4,803,959 | 2/1989 | Sherrick et al. | 15/317 X |

FOREIGN PATENT DOCUMENTS

| | | | |
|---|---|---|---|
| 908876 | 4/1954 | Fed. Rep. of Germany | 191/12 R |
| 2405789 | 10/1974 | Fed. Rep. of Germany | 191/12 R |
| 611244 | 5/1979 | Switzerland | 191/12.2 R |
| 493845 | 3/1976 | U.S.S.R. | 191/12 R |
| 905674 | 9/1962 | United Kingdom | 191/12 R |

OTHER PUBLICATIONS

Rysewyk, Western Electric Technical Digest No. 27, "A Retractable Electric Power Cable", Jul. 1972, pp. 49–50.

Primary Examiner—Michael S. Huppert
Assistant Examiner—Scott L. Lowe
Attorney, Agent, or Firm—Harness, Dickey & Pierce

[57] ABSTRACT

An improved control assembly is provided for supporting a helically coiled flexible conductor between two components that are movable relative to one another. The control assembly is slidably movable along a support rod in response to movement of one component relative to the other and is floatable upon the support rod to enable the control assembly to maintain proper alignment with the support rod along the length of the rod. In addition, as convolutions of the coiled conductor are discharged over a knob at the end of the control assembly, the control assembly is rotationally indexed around the support rod so that wear of the interior surface of the control assembly is evenly distributed around the internal bore of the control assembly.

7 Claims, 3 Drawing Sheets

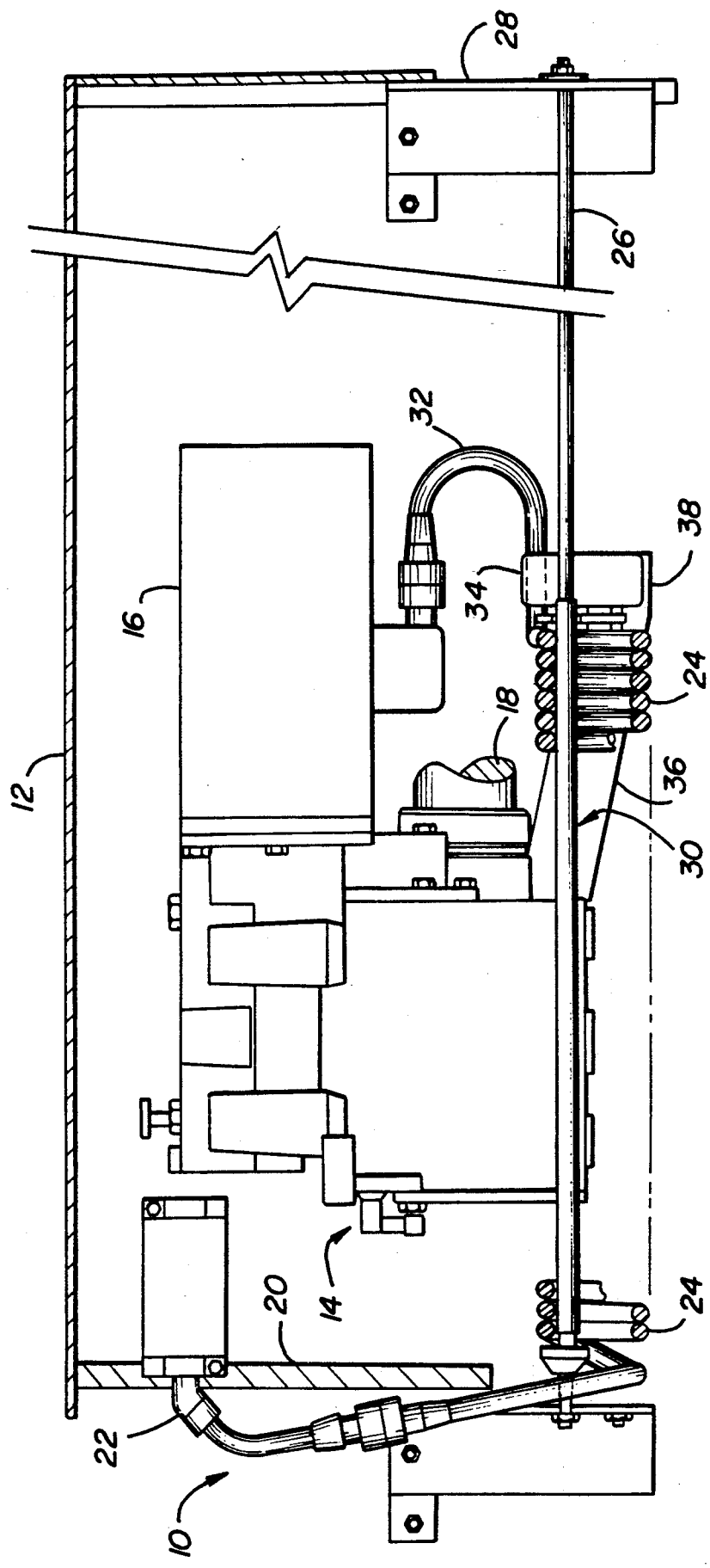

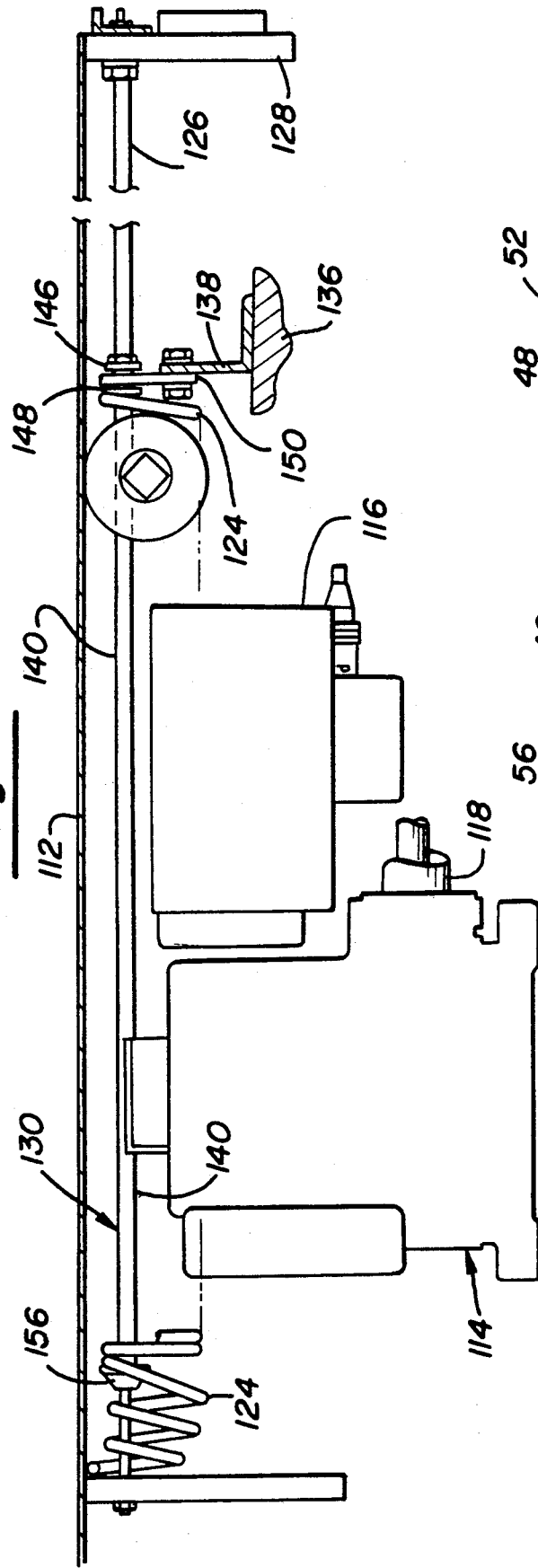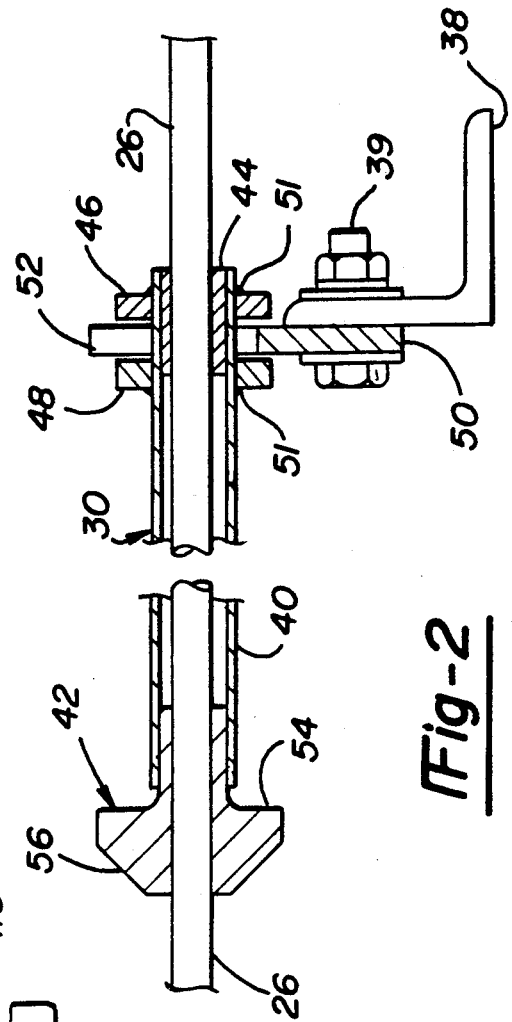

FLOATING CABLE LOOP CONTROL ASSEMBLY

BACKGROUND AND SUMMARY OF THE INVENTION

The present invention relates to a system for handling coiled electrical conductors for providing connection to movable elements and has been developed in the connection with overcoming problems that arise where a power connection must be provided to a movable motor. Such an application is employed in long retracting sootblowers wherein the motor and the supporting carriage travel with a long lance tube. Sootblowers are used to project a stream of blowing media such as water or steam against internal surfaces of large scale boilers for removing slag and ash encrustations. Due to the high temperature within the boiler, retracting sootblowers are often used in which a lance tube is periodically advanced into and withdrawn from the boiler during the cleaning cycle.

The sootblower carriage motor and lance tube are typically supported on tracks carried by a substantially horizontal beam structure. The carriage is arranged to travel along the beam for distances which may be as great as 50 or more feet. The motor may be either electric or air powered. Various power feeding means of an extendable and retractable character have been employed. In boiler environments where sootblowers are utilized, several factors tend to shorten equipment life. Such factors include heat, vibration and the presence of abrasive fly ash in the atmosphere. Sliding electrical contacts are inefficient and undesirable in such environments, so that some form of continuous cable is desirable to supply electric power. The life of electric cables employed in this service has been less than satisfactory, however, due to the repeated flexing of the cable as well as the factors above mentioned.

U.S. Pat. No. 3,819,880 issued Jun. 25, 1974, commonly assigned and incorporated herein by reference, discloses one solution to this problem which has been found commercially practical and which has been successfully employed. In this apparatus, a helically coiled flexible electric cord is supported upon a rod extending in the direction of travel of the sootblower motor and carriage. The system provides a controlled extension and retraction of the coiled conductor for reducing stress on the conductor thereby increasing operating life.

As described in the above mentioned patent, a cable guiding sleeve is slidably carried along the rod and is of sufficient length to store the helical coils when the sootblower is in a retracted position. The sleeve is coupled to the sootblower carriage and motor so as to move along the rod as the sootblower is extended into and retracted from the boiler. However, because the sootblower motor and carriage are carried upon a beam structure separate from the rod supporting the sleeve, the desired alignment of the sleeve and rod is not always achieved. The result is increased wear along the inner surface of the sleeve as the sleeve travels along the rod. In an effort to provide proper alignment it is typically necessary to bend the tow brackets used to couple the sleeve with the sootblower carriage. However, due to variations in the alignment of the rod and the support beam along their lengths, it is difficult to maintain proper alignment between the rod and carriage over the long lengths of travel required.

Accordingly, it is an object of the present invention to improve the alignment of a sootblower conductor coil sleeve with the supporting rod to reduce wear of the sleeve.

It is a feature of the present invention to decouple the sleeve from the sootblower motor and carriage so that the only forces applied to the sleeve are axial forces necessary to move the sleeve along the rod, leaving the sleeve free to move vertically and angularly to align itself with the rod.

It is a further feature of the present invention that the sleeve is free to rotate about the rod. As the sleeve is moved along the rod and coils of the coiled conductor are payed out over a knob at the end of the sleeve, the coil sliding over the knob causes slight rotation of the sleeve with the result that wear along the inside of the sleeve is evenly distributed about the sleeve's inner circumference.

Further objects, features and advantages of the invention will become apparent from a consideration of the following description and the appended claims when taken in connection with the accompanying drawings.

BRIEF DESCRIPTION OF THE DRAWINGS

FIG. 1 is a side elevational view of a sootblower containing the floating loop control assembly of the present invention;

FIG. 2 is an enlarged cross-sectional view of the floating loop control assembly of the present invention;

FIG. 5 is an alternative embodiment of the loop control assembly placed above rather than below the sootblower carriage and motor.

DETAILED DESCRIPTION OF THE INVENTION

Figure 3:
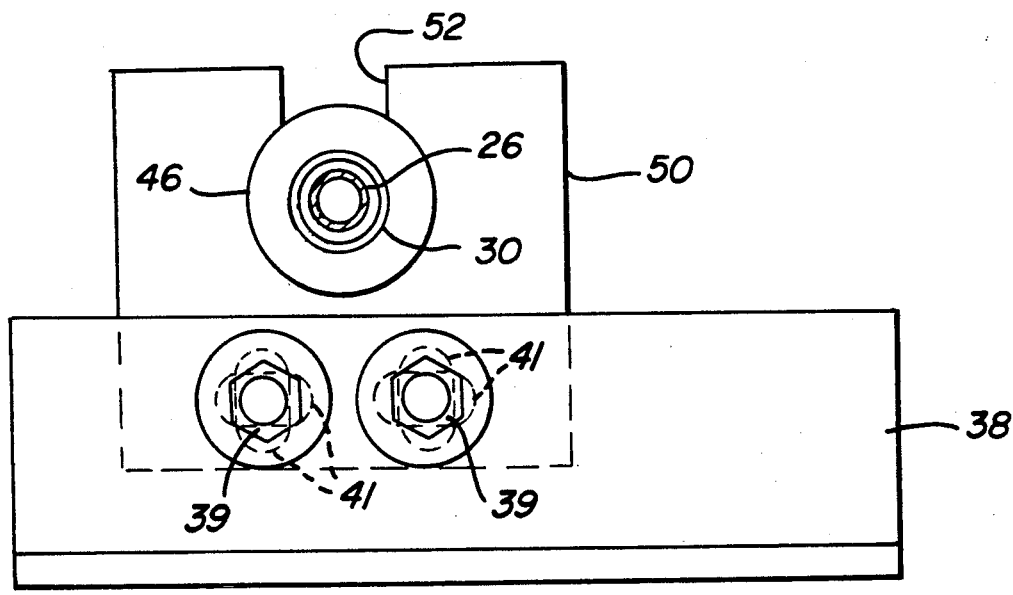
FIG. 3 is an end view of the loop control assembly of the present invention.
Figure 4:
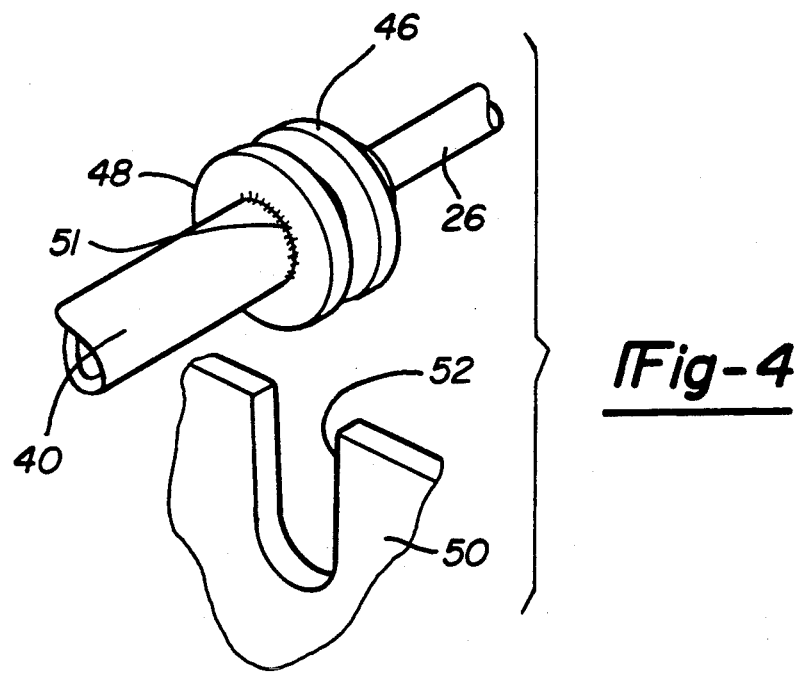
FIG. 4 is an exploded perspective view of a portion of the loop control assembly of the present invention.

The sootblower shown in the drawings and generally designated at 10 is presumed to be of a well known long retracting type, comprising a main support beam 12 in the general form of an inverted U-channel. Such a sootblower is described in more detail in commonly assigned U.S. Pat. No. 3,439,376, hereby incorporated by reference. The sootblower includes a carriage generally designated 14 rollably supported on the beam in a well known manner (not illustrated). Carriage 14 incorporates a motor 16 attached to and traveling with the carriage and which drives the carriage and the lance tube 18 (fragmentarily illustrated) axially and rotatably.

The motor 16 derives its power from a suitable source of electricity which is deliverable through conventional means to the vicinity of the rear end wall 20 of the sootblower, where it is electrically connected to a fixedly secure end portion 22 of the helically coiled flexible conductor 24. The end portion 22 is secured to the end wall 20 by means not shown. The coiled conductor 24 is suspended upon a rod 26 formed of steel having a low friction covering such as a nylon sheath. The rod is fastened at its rear end to wall 20 and at its forward end to a bracket 28 near the front or wallbox end of the sootblower.

Although a sootblower powered by an electric motor is illustrated and described in connection with the invention, it will be recognized that the invention might be used in other environments, and that the flexible connector might be a tube for fluid, rather than an electrical conductor. The word "rod" is intended to encompass any suitable internal support of restricted cross-section.

The coils of the flexible conductor 24 are carried by a floating loop control assembly 30 shown in greater detail in FIGS. 2 and 3. The opposite end 32 of the conductor is coupled to the motor 16 and is also fixed to slide block 34 by means not shown. Slide block 34 is connected to the carriage 14 by the tow bar 36 and angled bracket 38. The control assembly 30, as best shown in FIG. 2, consists of a tubular extension sleeve 40 slidably over-fitted on the support rod 26. The sleeve 40 carries at its rearward end a knob 42 that also serves as a bushing at the rearward end of the sleeve. A forward bushing 44 is provided at the forward end of the sleeve 40. The knob 42 and bushing 44 are preferably formed of nylon impregnated with molybdenum disulphide to provide a low friction interface between the loop control assembly 30 and the support rod 26.

Disposed adjacent to the forward end of the loop control assembly are a pair of discs 46 and 48 forming a collar assembly. Discs 46 and 48 extend radially from the sleeve 40 and are axially spaced from one another. The discs are attached to the sleeve as shown by welds 51. The loop control assembly 30 is freely slidably along the rod 26 and is also free to rotate about the longitudinal axis of the rod.

The angle bracket 38 is coupled to the carriage 14 by the tow bar 36. A flange plate 50 extends from the angle bracket 38 and lies in a plane perpendicular to the support rod 26. Nut and bolt assemblies 39 attach the flange plate to the bracket 38. The holes in the flange plate and bracket are slotted as shown at 41 in FIG. 3 to allow adjustment during assembly. A U-shaped cut-out portion 52 in one edge of the flange plate 50 enables the flange plate to substantially surround the support rod 26 between the two discs 46 and 48. As the carriage 14 is moved along the beam 12, the flange plate 50 will contact one of the two discs 46 and 48 to move the control assembly 30 axially along the support rod 26. A small clearance between the flange plate 50 and the discs 46 and 48 enables the carriage to move slightly before contact with the discs to initiate movement of the control assembly. Likewise, the slot 52 is spaced radially from the sleeve 40 to enable the carriage to move radially relative to the support rod 26 without contacting the sleeve. As a result, the only forces transmitted from the carriage to the loop control assembly are axial forces to slide the assembly along the support rod 26. The loop control assembly is thus free to float on the support rod and to self align with the support rod. In addition, since the rod and sleeve are round in cross section, the loop control assembly is enabled to rotate about the axis of the support rod 26.

As the carriage and loop control assembly move forward to extend the conductor 32, the knob 42 resists escape of the convolutions of the conductor but it is so proportioned that the successive convolutions are pulled off relatively easy and with an amount of resistance which results in the convolutions becoming spaced relatively uniformly along the rod as they drop onto the rod during such forward movement. The tendency of the knob to retain the convolutions on the moving control assembly prevents undue stretching of the conductor and eliminates the drag resistance of the convolutions which remain on the control assembly during extensive movement.

The proportioning of the knob to achieve this effect may vary somewhat with the composition of the insulated sheath on the conductor but has not been found to be critical or difficult to achieve. The system works well with a vertical wall as indicated at 54 on the forward side of the knob. Each convolution closest to the knob on the forward side of the knob rises and rides over the knob as the control assembly moves forwardly. While doing so, the convolution produces a torsional load on the knob of sufficient force to cause slight rotation of the control assembly. This provides a rotational indexing of the control assembly during operation. The indexing is beneficial in evenly distributing wear of the inner bore of the knob 42 and the bushing 44 about the circumference of the knob and bushing rather than concentrating the wear at one location as with non-rotatable control loop assemblies. The rear face of the knob is provided with a wall 56 that is sloped at 45° to assist the convolutions to ride back over the knob and return to the sleeve during rearward movement of the carriage and contraction of the helix.

FIG. 5 illustrates an alternative embodiment of the invention in which the loop control assembly is installed above the sootblower carriage. Like components are given the same reference numeral with the prefix of 100. The loop control assembly 130 is virtually identical to the assembly 30. The tow bracket 136 is shaped differently in coupling the assembly 130 to the sootblower.

By enabling the control assembly to freely float on the support rod, the control assembly is self aligning with the rod with no need to bend or adjust the tow bar to achieve optimal alignment. In addition, the rotating of the control assembly caused by the convolutions sliding over the knob 42 results in an even distribution of wear about the inner bore of the control assembly knob and bushing.

It is to be understood that the invention is not limited to the exact construction illustrated and described above, but that various changes and modifications may be made without departing from the spirit and scope of the invention as defined in the following claims.

We claim:

1. Apparatus for providing power conductive communication between two components one of which is movable relative to the other, comprising:
   a helically coiled flexible member having one end fast with respect to one of said components and its other end fast with respect to the other component whereby the helix is extended and contracted axially during movement of said components from and toward one another;
   a rod extending through the helix to support said member;
   a sleeve slidably over-fitted upon the rod within the helix;
   a knob attached to the sleeve at an end of said sleeve closest to a first of said two components; and
   means associated with a second of said two components and the opposite end of said sleeve for moving said sleeve axially along said rod in response to movement of said second component away from and toward said first component with the application of substantially only axial forces from said second component to said sleeve whereby said sleeve is enabled to self align with said rod;
   said knob being of a size to frictionally oppose but permit successive escape of convolutions of the flexible member during extension of the helix.

2. The apparatus of claim 1 wherein said moving means includes a pair of radially extending discs axially spaced along said sleeve and a flange extending from said second component in a plane perpendicular to said rod and disposed between said discs and spaced therefrom whereby said second component is permitted to move away from and toward said first component a distance before contacting said discs and moving said sleeve axially along said rod.

3. The apparatus of claim 2 wherein said flange forms an opening extending inwardly of said flange from an edge of said flange to substantially surround said sleeve, said opening being radially spaced from said sleeve to permit radial movement of said second component and flange relative to said rod without contacting said sleeve.

4. The apparatus of claim 1 wherein said sleeve and said rod are circular in cross-section to permit rotation of said sleeve about said rod.

5. In a sootblower of the retracting type having a carriage with a motor movable longitudinally to insert and retract a lance tube, means for supporting a helically coiled flexible member attached at a first end to a stationary power source and attached at a second end to said motor, comprising:

- a rod extending longitudinally through the helix to support said member;
- a sleeve slidably over-fitted upon the rod within the helix;
- a knob attached to the sleeve at an end of said sleeve closest to said member first end;
- a pair of radially extending discs axially spaced along said sleeve adjacent the opposite end of said sleeve;
- a flange extending from said carriage in a plane perpendicular to said rod and disposed between said discs whereby upon longitudinal movement of said carriage, said flange contacts one of said pair of discs to move said sleeve axially along said rod; and
- said knob being of a size to frictionally oppose but permit successive escape of convolutions of the flexible member during extension of the helix.

6. The sootblower of claim 5 wherein said flange forms an opening extending inwardly of said flange from an edge of said flange into which opening said rod is placed whereby said flange substantially surrounds said sleeve, said opening being spaced from said sleeve to permit radial movement of said carriage and flange relative to said rod without contacting said sleeve.

7. The sootblower of claim 5 wherein said sleeve and said rod are circular in cross section thereby permitting said sleeve to rotate about said rod.

* * * * *